United States Patent
Christy et al.

(10) Patent No.: US 9,745,217 B2
(45) Date of Patent: Aug. 29, 2017

(54) SYSTEM AND METHOD FOR LIME STABILIZATION OF LIQUID SLUDGE

(71) Applicants: Richard W. Christy, Eagleville, PA (US); Michael Quici, Ambler, PA (US); Stephen H. Yost, Warminster, PA (US)

(72) Inventors: Richard W. Christy, Eagleville, PA (US); Michael Quici, Ambler, PA (US); Stephen H. Yost, Warminster, PA (US)

(73) Assignee: RDP TECHNOLOGIES, INC., Conshohocken, PA (US)

( * ) Notice: Subject to any disclaimer, the term of this patent is extended or adjusted under 35 U.S.C. 154(b) by 326 days.

(21) Appl. No.: 14/048,427

(22) Filed: Oct. 8, 2013

(65) Prior Publication Data

US 2014/0034582 A1 Feb. 6, 2014

Related U.S. Application Data

(63) Continuation-in-part of application No. 13/302,312, filed on Nov. 22, 2011, now Pat. No. 9,174,861.

(51) Int. Cl.
| | |
|---|---|
| *C02F 11/14* | (2006.01) |
| *C02F 1/52* | (2006.01) |
| *C02F 1/66* | (2006.01) |

(52) U.S. Cl.
CPC .............. *C02F 11/14* (2013.01); *C02F 1/529* (2013.01); *C02F 1/66* (2013.01); *C02F 2209/005* (2013.01); *C02F 2209/10* (2013.01)

(58) Field of Classification Search
None
See application file for complete search history.

(56) References Cited

U.S. PATENT DOCUMENTS

| | | | |
|---|---|---|---|
| 2,904,401 | A | 9/1959 | Booth |
| 3,969,094 | A | 7/1976 | Dunson, Jr. et al. |
| 4,064,744 | A | 12/1977 | Kistler |
| 4,166,997 | A | 9/1979 | Kistler |
| 4,261,953 | A | 4/1981 | Gisler |
| 4,454,770 | A | 6/1984 | Kistler |
| 4,482,528 | A | 11/1984 | Emmett |
| 4,539,024 | A | 9/1985 | Stehning et al. |
| 4,588,559 | A | 5/1986 | Emmett |
| 5,013,458 | A | 5/1991 | Christy, Sr. et al. |

(Continued)

FOREIGN PATENT DOCUMENTS

GB 2276876 A * 10/1994 ............... C02F 11/12

*Primary Examiner* — Krishnan S Menon
*Assistant Examiner* — Ryan B Huang
(74) *Attorney, Agent, or Firm* — Paul & Paul

(57) ABSTRACT

A lime stabilization system and method is provided in which thickened liquid sludge and lime are separately delivered, under controlled conditions, to a reaction tank and mixed therein to a predetermined pH, controlled via a programmable logic computer. The weight of liquid sludge in the reaction tank is controlled from the computer via load cells that measure the weight of such liquid sludge in the reaction tank. The computer monitors the amount of liquid sludge and lime delivered to the reaction tank, for mixing therein to a desired pH, for a predetermined amount of time, and the resultant mix is discharged from the reaction tank, to a holding tank, for return to the land.

23 Claims, 2 Drawing Sheets

(56) References Cited

U.S. PATENT DOCUMENTS

Figure 1:
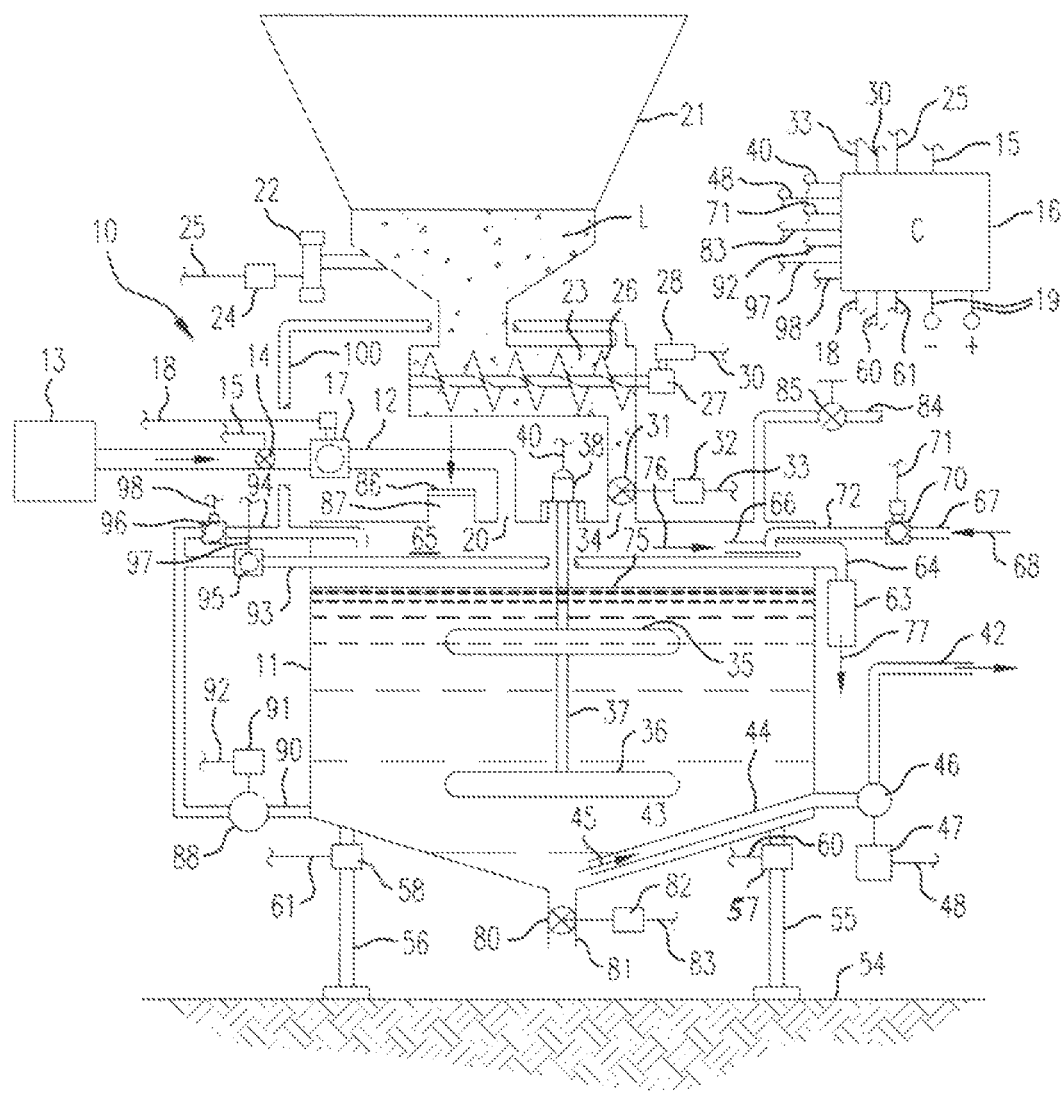

| | | | |
|---|---|---|---|
| 5,094,752 A * | 3/1992 | Davis et al. | 210/614 |
| 5,229,011 A | 7/1993 | Christy, Sr. et al. | |
| 5,292,353 A | 3/1994 | Kaufman et al. | |
| 5,313,022 A | 5/1994 | Piroozmandi et al. | |
| 5,336,481 A | 8/1994 | Muzik et al. | |
| 5,346,616 A | 9/1994 | Christy, Sr. et al. | |
| 5,368,731 A | 11/1994 | Pesotini | |
| 5,401,402 A | 3/1995 | Christy et al. | |
| 5,405,536 A | 4/1995 | Christy | |
| 5,433,844 A | 7/1995 | Christy | |
| 5,554,279 A | 9/1996 | Christy | |
| 5,618,442 A | 4/1997 | Christy | |
| 5,647,996 A * | 7/1997 | Yablonsky et al. | 210/710 |
| 5,746,983 A | 5/1998 | Stephansen | |
| 5,770,823 A | 6/1998 | Piroozmandi | |
| 5,783,073 A | 7/1998 | Christy et al. | |
| 5,895,763 A * | 4/1999 | Edstrand et al. | 436/55 |
| 6,568,842 B1 | 5/2003 | Murray | |
| 7,416,673 B2 | 8/2008 | Christy et al. | |
| 7,669,348 B2 | 3/2010 | Christy et al. | |
| 8,065,815 B2 | 11/2011 | Christy et al. | |
| 2006/0231507 A1 | 10/2006 | Christy et al. | |
| 2006/0231511 A1 | 10/2006 | Christy et al. | |
| 2008/0185324 A1 | 8/2008 | Christy et al. | |
| 2010/0196258 A1 * | 8/2010 | Stephansen | 423/636 |

* cited by examiner

SYSTEM AND METHOD FOR LIME STABILIZATION OF LIQUID SLUDGE

CROSS-REFERENCE TO RELATED APPLICATIONS

This is a continuation-in-part of U.S. patent application Ser. No. 13/302,312 filed Nov. 22, 2011, the complete disclosure of which is herein incorporated by reference.

FIELD OF THE INVENTION

The present invention is directed to a system and process for lime stabilization of liquid sludge.

SUMMARY OF INVENTION

The treatment of liquid sewage sludge, for example municipal sewage sludge, in general, is known, for example, in accordance with U.S. Pat. No. 5,783,073, the complete disclosure of which is herein incorporated by reference. It is desirable to treat liquid sewage sludge so that it can be returned to the land, in order to allow beneficial re-use of the sludge. Particularly, such is desirable when the land is to be used to grow agricultural and ornamental crops.

The present invention is directed to the accurate measurement and monitoring of the quantity of liquid sludge being treated, along with the accurate measurement and monitoring of the amount of alkaline (lime) being added to the liquid sludge via precision control of the various aspects of the system and process.

Accordingly, it is an object of this invention to provide a system and method for treating liquid sludge via lime stabilization.

It is another object of this invention to accomplish the above object by mixing sewage sludge with lime in a reaction tank.

It is another object of this invention to accomplish the above objects by first thickening the liquid sludge to a desired solids concentration.

It is another object of this invention to measure the amount of liquid sludge in the reaction tank via load cells, and then conveying that information to a computer.

It is a further object of this invention to accomplish the above objects, by providing lime from a lime container, such as a lime storage silo, and delivering the lime from the storage silo to the reaction tank while measuring the amount of lime delivered to the reaction tank and conveying that information to a computer, under controlled conditions.

It is a further object of this invention to accomplish the above objects, wherein a computer is connected to the load cells that measure the amount of liquid sludge in the reaction tank with the computer also monitoring the amount of liquid sludge and lime being delivered to the reaction tank.

It is a further object of this invention to mix the lime and liquid sludge in the reaction tank to a pre-determined pH that is controlled via the computer.

It is yet another object of this invention to accomplish the above objects whereby the liquid sludge/lime mix is discharged from the reaction tank when a predetermined pH of the mix has been reached.

It is another object of this invention to accomplish the above objects, wherein a vibrator vibrates the lime in the lime silo for facilitating delivery of lime to the reaction tank.

Yet another object of this invention is to provide a method and system, in which a dust arrester is connected to the reaction tank, including the use of water eduction for drawing off dust from the upper level of the reaction tank above the liquid level therein.

It is a further object of this invention to accomplish the objects, wherein an acid wash system is provided for washing accumulated lime from various surfaces within the system.

Other objects and advantages of the present invention will be readily apparent upon a reading of the following brief descriptions of the drawing figures, the detailed descriptions of the preferred embodiments, and the appended claims.

BRIEF DESCRIPTIONS OF THE DRAWING FIGURES

FIG. 1 is a computer controlled schematic illustration of the system of this invention, wherein a lime silo provides lime to a reaction tank, and with thickened liquid sludge being delivered to the reaction tank under controlled conditions and with a dust arrester and acid wash system connected to the reaction tank, with mixing impellers in the reaction tank for mixing lime and liquid sludge therein prior to discharge of liquid sludge/lime mix from the reaction tank after a desired pH is reached.

Figure 2:
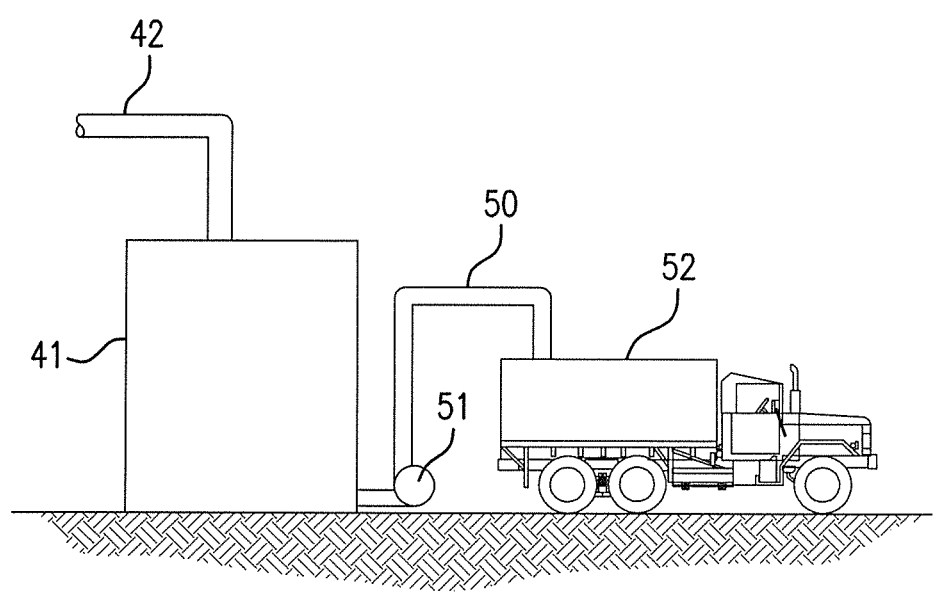

FIG. 2 is a schematic illustration of a storage tank for receiving the liquid sludge/lime mix discharged from the reaction tank, to then be delivered to a vehicle for discharge onto land.

DETAILED DESCRIPTIONS OF THE PREFERRED EMBODIMENTS

Referring now to the drawings in detail, reference is first made to FIG. 1, wherein the system 10 is illustrated, as including a reaction tank 11, into which sewage sludge is delivered via delivery line 12, from a liquid sludge thickening mechanism 13. The thickening mechanism 13 may take any of various forms, such as a sludge clarifier, a gravity operative sludge thickener, such as of the belt or other conveyor type, or a rotary drum operative sludge thickener, as may be desired.

In accordance with the present system and method, the thickening that occurs to the liquid sludge prior to delivery into the tank, is a thickening that is preferably within the range of 1%-3%. The solids content of liquid sludge delivered to the tank 11 is in the range of 0% to about 10%, but preferably 0% to about 7%.

Thickened sludge therefore leaves the sludge thickener 13 via the delivery line 12, as allowed by an opened/closed valve 14 controlled via computer control line 15 from computer 16 (also designated by the letter "C"), monitored by suspended solids meter 17, such as a coreolis meter, that monitors the suspended solids in the delivery line 12 and communicates that information via computer control line 18 to the computer 16. The thickened sludge enters the reaction tank 11 via liquid sludge inlet 20. Lime L is present in the lime silo 21 and is vibrated therein via vibrator 22 which shakes lime into a lime delivery conveyor 23, breaking up clumps of lime that may form in the silo 21. The vibrator 22 is controlled by a motor 24 operated via control line 25 from the computer 16. Within the lime delivery conveyor 23 there is an auger 26 rotatably driven via motor 27 and its control 28, that, in turn, is controlled from control line 30 connected to the computer 16.

A valve 31 actuated by a valve actuator 32, is controlled via line 33 from the computer 16 with the valve 31 operating as a lime isolation control whereby lime is delivered to the reaction tank under controlled conditions for measuring the amount of lime delivered into the reaction tank via lime inlet 34.

Within the reaction tank 11 upper and lower impellers 35, 36 carried by rotatable shaft 37 provide a means for mixing lime and liquid sludge in the tank 11. The shaft 37 is driven via motor 38, controlled from the computer 16 via control line 40.

The thus driven and controlled impellers 35, 36, cause the liquid sludge and lime to be mixed for a predetermined period of time, such as a few minutes, before being pumped to a holding tank 41 of FIG. 2, via discharge line 42.

At the bottom 43 of the reaction tank 11, there exist a suction line 44, for conveying the treated sludge/lime mix from the tank 11 in the direction of the arrow 45, under reduced pressure conditions via pump 46, operated via a motor 47, controlled through control line 48 from the computer 16, whereby the suction side 44 of the line connected to the pump 46, receives the liquid sludge/lime mix and delivers it via discharge line 42, to the holding tank 41 for subsequent delivery via line 50, pumping the liquid sludge/lime mix from the bottom of the holding tank 41 via pump 51, into a truck 52 or other vehicle, for delivery of the treated liquid sludge/lime mix to another location, such as onto land for treatment of crops or the like.

The reaction tank 11 is supported on a horizontal surface 54 via support legs 55, 56, with load cells 57 and 58 measuring the weight of liquid sludge delivered into the tank 11 and conveying that information via information delivery lines 60, 61 to the computer 16 for monitoring the amount of liquid sludge being delivered into the reaction tank 11. The computer 16 also monitors the amount of lime being delivered to the reaction tank, via either or both of control lines 30, 33 connected to the computer 16, by measuring either the amount of lime passing through the valve 31 controlled by valve operator 32, and/or being delivered to the valve 31 as allowed by rotation of the auger 26 via control mechanisms 27, 28.

In accordance with the above-described system and method, the pH of the liquid sludge/lime mix is increased preferably to about 12, and in any event, above a pH of about 11, and is uniform throughout the tank 11.

It will be apparent that the computer 16 can be a programmable logic computer, set to control the pH of the liquid sludge/lime mix in the reaction tank 11, by precise and careful control of the amount of lime that is provided into the tank 11, to mix with a controlled amount of liquid sludge delivered thereto via delivery line 12. The computer 16 is electrically powered from power lines 19.

A dust arrester 63 is provided connected via line 64 to the upper end of the reaction tank 11, above the liquid level by means of dust control line 64, opening into the upper end 65 of the tank 11 via line 66, whereby water entering a line 67 in the direction of arrow 68, through valve 70 controlled by control line 71 from the computer 16, will allow water to enter the duct 64 via line 72, to create a low pressure zone in duct portion 66, for eduction of air out of the upper end 65 of the tank 11 above the liquid level 75 of liquid sludge and lime therein, in the direction of arrow 76, to discharge dust to atmosphere through the dust arrester 63, in the direction of the arrow 77, and with water from line 64 leaving dust arrester 63 in the direction of arrow 77, to a drain (not shown).

The dust arrester 63 is essentially comprised of a filter material, such as a microfilter material, and may be constructed like a sock, having a porous cylindrical surface, and a porous bottom surface, whereby the pore size of the dust arrester 63 is sufficient to capture dust particles above the liquid level 75, from the zone 65 inside the tank 11, but with the dust arrester 63 allowing air to pass through the pores thereof. The dust arrester 63 may periodically be cleaned or replaced, with the cleaning being done via the acid wash system that will be described hereinafter, along with any other cleaning of the dust arrester 63 that is desired.

A system is provided for acid wash of lime from various surfaces of the lime stabilization system after discharge of the liquid sludge/lime mix 43 from the reaction tank 11, after all of the liquid sludge/lime mix has been emptied from the tank 11. An openable valve 80 in the bottom discharge line 81 is closed by computer actuation of a valve operator 82 via control line 83 from computer 16, closing off line 81, so that water provided at line 84 can be allowed to enter the tank via the opening of manual valve 85, to substantially fill the reaction tank 11 with water. Then, an acid is provided via opening a hatch 86 covering acid inlet 87, allows for providing an appropriate amount of an acid into the reaction tank 11, to make an acid/water mix in the tank 11, preferably by actuating the motor 38 from computer 16, so that impellers 35, 36 can be rotated, facilitating the mixing of acid and water in the tank 11.

A pump 88 in acid/water delivery line 90 pumps water from the bottom of the tank 11, motor controlled at 91 via control line 92 from the computer 16, to deliver the acid/water mix to delivery lines 93, 94 as allowed by valves 95, 96 controlled by respective control lines 97, 98 from the computer 16, to open and allow the acid/water mix to pass through respective valves 95, 96.

This allows the acid/water mix to enter line 100, into the lime conveyor 23, to clean scale formed by lime therein, after the computer allows the valve operator 32 to open the valve 31 for discharge of the acid/water mix back into the tank 11.

With the valve 95 open, the acid/water mix can likewise be delivered into duct 64, to remove scale from the dust arrester 63.

In this manner, the acid/water delivery system allows for removal of lime-formed scale from the reaction tank, the lime delivery system, and the dust arrester, as well as any interconnected devices, valves and the like having scale formed therein, including the discharge line 44 and its related pump 46 and other components.

The addition of dry lime into the tank 11 via the lime delivery means, allows a reduction in the volume of sludge to be hauled away via the truck 52 of FIG. 2 in the amount of about 10%.

The acid wash system for removing scale reduces equipment component wear, substantially eliminates plugged delivery lines and reduces maintenance cost and shut-down cleaning operations.

It will be apparent that, in lieu of the impellers 35, 36, in the reaction tank 11, any suitable mixing devices could be substituted, such as rotating augers, pumps, mixing blades, or the like.

In accordance with the present invention, with its computer control, the system can be operated on a semi-continuous basis, in batches that could be a certain number per hour, or per day, as may be desired.

It will be apparent from the foregoing that various modifications may be made in the apparatus and method of this invention all within the spirit and scope of the invention as defined in the appended claims. Where structure is recited in means plus function language or steps plus function language, it will be understood that the same is to be of the broadest possible scope, embodying not only the particular apparatus or steps set forth in the claims hereof, but also all equivalents thereof that would be within the scope and understanding of those skilled in this art, whether or not such are specifically disclosed in this application.

What is claimed is:

1. A lime stabilization system for treating liquid sludge comprising:
    (a) a reaction tank having a sludge inlet for receiving liquid sludge delivered to the reaction tank and a lime inlet for receiving lime delivered to the reaction tank;
    (b) means for thickening liquid sludge to a selected solids concentration;
    (c) liquid sludge delivery means for delivering thickened liquid sludge from said means for thickening liquid sludge to the reaction tank via the sludge inlet, including valve means for controlling the amount of thickened liquid sludge delivered to the reaction tank;
    (d) load cell means for measuring the amount of thickened liquid sludge in the reaction tank;
    (e) a lime container for containing lime for delivery to the reaction tank;
    (f) lime delivery means for delivering lime from the lime container to the reaction tank;
    (g) a computer connected to the load cell means of clause (d), the liquid sludge delivery means of clause (c), and the lime delivery means of clause (f), the load cell means conveying information indicative of the amount of thickened liquid sludge delivered into the reaction tank via one or more information delivery lines to the computer, the computer controlling the liquid sludge delivery means to deliver an amount of thickened liquid sludge to the reaction tank, the computer controlling the lime delivery means via one or more control lines to deliver an amount of lime to the reaction tank sufficient to produce a thickened liquid sludge/lime mixture having a pH that has reached a predetermined pH;
    (h) mixing means in the reaction tank connected to the computer, the computer operating the mixing means in the reaction tank for a predetermined period of time such that the pH of the thickened liquid sludge/lime mixture has uniformly reached the predetermined pH; and
    (i) discharge means for discharging the thickened liquid sludge/lime mixture from the reaction tank after the liquid sludge/lime mixture has been mixed for the predetermined period of time,
    wherein none of the thickened liquid sludge treated with lime in the reaction tank is supplied to the means for thickening liquid sludge during operation of the lime stabilization system for treating liquid sludge.

2. The lime stabilization system of claim 1, wherein the means for thickening liquid sludge comprises any of:
    (a) a sludge clarifier;
    (b) a gravity operative sludge thickener; and
    (c) a rotatory drum operative sludge thickener.

3. The lime stabilization system of claim 1, wherein the valve means of the liquid sludge delivery means includes a meter for measuring the amount of suspended solids in the liquid sludge.

4. The lime stabilization system of claim 1, wherein the lime delivery means includes a motor driven lime feed conveyor.

5. The lime stabilization system of claim 1, wherein the lime delivery means includes a valve and valve operator for opening and closing the valve.

6. The lime stabilization system of claim 1, wherein the lime container comprises a lime silo.

7. The lime stabilization system of claim 1, wherein the mixing means includes at least one impeller mounted on a rotatable shaft and an impeller motor for driving the shaft, with means connecting the impeller motor to the computer for computer control of the mixing time of liquid sludge/lime mixing in the reaction tank.

8. The lime stabilization system of claim 1, wherein the discharge means includes a pump and pump motor, with means connecting the pump motor to the computer for computer control of the liquid sludge/lime mix from the reaction tank.

9. The lime stabilization system of claim 1, including a holding tank connected to the discharge means for receiving the thickened liquid sludge/lime mixture from the reaction tank.

10. The lime stabilization system of claim 1, including a vibrator for vibrating lime in the lime container for loosening lime in the container prior to delivery of lime from the lime container to the reaction tank.

11. The lime stabilization system of claim 1, including a dust arrester connected to an upper end of the reaction tank and a water supply means for supplying eduction water to the upper end of the reaction tank to create a low pressure zone therein for educting any dust in the upper end of the reaction tank out through the dust arrester.

12. The lime stabilization system of claim 1, including an acid wash system for washing lime scale from surfaces of the lime stabilization system, with the acid wash system including:
    (i) water supply means for supplying water to the reaction tank
    (ii) an acid inlet to the reaction tank for supplying acid to the reaction tank; and
    (iii) a valve operated acid/water delivery system comprising a pump for receiving an acid/water mix from the reaction tank and acid/water delivery lines for delivering an acid/water mix to surfaces having lime adhered thereto, such surfaces including the reaction tank, the lime delivery means, and the dust arrester.

13. The lime stabilization system of claim 1, wherein the means for thickening liquid sludge comprises any of:
    (a) a sludge clarifier;
    (b) a gravity operative sludge thickener; and
    (c) a rotatory drum operative sludge thickener,
    wherein the valve means of the liquid sludge delivery means includes a meter for measuring the amount of suspended solids in the liquid sludge, wherein the lime delivery means includes a motor driven lime feed conveyor, wherein the lime delivery means includes a valve and valve operator for opening and closing the valve, wherein the lime container comprises a lime silo, wherein the mixing means includes at least one impeller mounted on a rotatable shaft and an impeller motor for driving the shaft, with means connecting the impeller motor to the computer for computer control of the mixing time of liquid sludge/lime mixing in the reaction tank, wherein the discharge means includes a pump and pump motor, with means connecting the pump motor to the computer for computer control of the liquid sludge/lime mix from the reaction tank, including a holding tank connected to the discharge means for receiving the liquid sludge/lime mix from the reaction tank, including a vibrator for vibrating lime in the lime container for loosening lime in the container prior to delivery of lime from the lime container to the reaction tank, including a dust arrester connected to an upper end of the reaction tank and a water supply means for supplying eduction water to the upper end of the reaction tank to create a low pressure zone therein for educting any dust in the upper end of the reaction tank out through the dust arrester and including an acid wash system for washing lime scale from surfaces of the lime stabilization system, with the acid wash system including:
  (i) water supply means for supplying water to the reaction tank;
  (ii) an acid inlet to the reaction tank for supplying acid to the reaction tank; and
  (iii) a valve operated acid/water delivery system comprising a pump for receiving an acid/water mix from the reaction tank and acid/water delivery lines for delivering an acid/water mix to surfaces having lime adhered thereto, such surfaces including the reaction tank, the lime delivery means, and the dust arrester.

14. A method of lime stabilization for treating liquid sludge comprising:
  (a) providing a reaction tank having a sludge inlet for receiving liquid sludge delivered to the reaction tank and a lime inlet for receiving lime delivered to the reaction tank;
  (b) providing means for thickening liquid sludge to a selected solids concentration;
  (c) thickening the liquid sludge to a selected solids concentration;
  (d) delivering the thickened liquid sludge to the reaction tank via the sludge inlet, including controlling the amount of liquid sludge delivered to the reaction tank;
  (e) providing load cells for measuring the amount of liquid sludge in the reaction tank and for conveying that information to a computer means;
  (f) providing a lime container for containing lime for delivery to the reaction tank;
  (g) delivering lime via a lime delivery means from the lime container to the reaction tank and measuring the amount of lime delivered to the reaction tank via the lime inlet and conveying that information to a computer means;
  (h) using a computer means connected to the load cells of clause (e) and the lime delivery means of clause (g) for monitoring the amount of liquid sludge and lime being delivered to the reaction tank;
  (i) mixing lime and liquid sludge in the reaction tank to a predetermined pH controlled by the computer; and
  (j) discharging the liquid sludge/lime mix from the reaction tank when the predetermined pH of clause (i) is reached,
  wherein none of the liquid sludge/lime mix from the reaction tank is supplied to the means for thickening liquid sludge in the method of lime stabilization for treating liquid sludge.

15. The method of claim 14, wherein the thickening of liquid sludge is via any of:
  (a) a sludge clarifier;
  (b) a gravity operative sludge thickener; and
  (c) a rotatory drum operative sludge thickener.

16. The method of claim 14, including the step of measuring the amount of suspended solids in the liquid sludge.

17. The method of claim 14, wherein the mixing of clause (h) is via at least one impeller mounted on a rotatable shaft and an impeller motor for driving the shaft, with the impeller motor connected to the computer for computer control of the mixing time of liquid sludge/lime mixing in the reaction tank.

18. The method of claim 14, wherein the discharge is via a pump and pump motor, with the pump motor connected to the computer for computer control of the liquid sludge/lime mix from the reaction tank.

19. The method of claim 14, including providing a holding tank connected to the discharge means for receiving the liquid sludge/lime mix from the reaction tank.

20. The method of claim 14, including the step of vibrating lime in the lime container for loosening lime in the container prior to delivery of lime from the lime container to the reaction tank.

21. The method of claim 14, including providing a dust arrester connected to an upper end of the reaction tank and a water supply for supplying eduction water to the upper end of the reaction tank to create a low pressure zone therein and educting any dust in the upper end of the reaction tank out through the dust arrester.

22. The lime method of claim 14, including providing an acid wash system for washing lime scale from surfaces of the lime stabilization system, with the acid wash system including:
  (i) a water supply for supplying water to the reaction tank
  (ii) an acid inlet to the reaction tank for supplying acid to the reaction tank; and
  (iii) a valve operated acid/water delivery system comprising a pump for receiving an acid/water mix from the reaction tank and delivering an acid/water mix to surfaces having lime adhered thereto, such surfaces including the reaction tank, the lime delivery means, and the dust arrester.

23. The method of claim 14, wherein the thickening of liquid sludge is via any of:
  (a) a sludge clarifier;
  (b) a gravity operative sludge thickener; and
  (c) a rotatory drum operative sludge thickener;
  including the step of measuring the amount of suspended solids in the liquid sludge; wherein the mixing of clause (h) is via at least one impeller mounted on a rotatable shaft and an impeller motor for driving the shaft, with the impeller motor connected to the computer for computer control of the mixing time of liquid sludge/lime mixing in the reaction tank; wherein the discharge is via a pump and pump motor, with the pump motor connected to the computer for computer control of the liquid sludge/lime mix from the reaction tank; including providing a holding tank connected to the discharge means for receiving the liquid sludge/lime mix from the reaction tank; including the step of vibrating lime in the lime container for loosening lime in the container prior to delivery of lime from the lime container to the reaction tank; including providing a dust arrester connected to an upper end of the reaction tank and a water supply for supplying eduction water to the upper end of the reaction tank to create a low pressure zone therein and educting any dust in the upper end of the reaction tank out through the dust arrester and including providing an acid wash system for washing lime scale from surfaces of the lime stabilization system, with the acid wash system including:
  (i) a water supply for supplying water to the reaction tank
  (ii) an acid inlet to the reaction tank for supplying acid to the reaction tank; and
  (iii) a valve operated acid/water delivery system comprising a pump for receiving an acid/water mix from the reaction tank and delivering an acid/water mix to surfaces having lime adhered thereto, such surfaces including the reaction tank, the lime delivery means, and the dust arrester.

\* \* \* \* \*